(12) United States Patent
Kobayashi

(10) Patent No.: US 9,813,647 B2
(45) Date of Patent: Nov. 7, 2017

(54) IMAGE PROCESSING APPARATUS, RADIATION IMAGING APPARATUS, IMAGE PROCESSING METHOD, AND STORAGE MEDIUM

(71) Applicant: CANON KABUSHIKI KAISHA, Tokyo (JP)

(72) Inventor: Tsuyoshi Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 15/171,605

(22) Filed: Jun. 2, 2016

(65) Prior Publication Data
US 2016/0366352 A1  Dec. 15, 2016

(30) Foreign Application Priority Data
Jun. 12, 2015 (JP) .................. 2015-119710

(51) Int. Cl.
| | |
|---|---|
| H04N 9/64 | (2006.01) |
| H04N 5/361 | (2011.01) |
| G06T 5/00 | (2006.01) |
| G06T 5/40 | (2006.01) |
| G06T 5/50 | (2006.01) |
| H04N 5/32 | (2006.01) |

(52) U.S. Cl.
CPC ............ *H04N 5/361* (2013.01); *G06T 5/002* (2013.01); *G06T 5/40* (2013.01); *G06T 5/50* (2013.01); *H04N 5/32* (2013.01); *G06T 2207/10116* (2013.01); *G06T 2207/20224* (2013.01); *G06T 2207/30061* (2013.01)

(58) Field of Classification Search
None
See application file for complete search history.

(56) References Cited

FOREIGN PATENT DOCUMENTS

JP  2004-201784 A  7/2004

*Primary Examiner* — Stephen Coleman
(74) *Attorney, Agent, or Firm* — Carter, Deluca, Farrell & Schmidt, LLP

(57) ABSTRACT

An image processing apparatus includes: a first correction unit configured to perform correction processing of subtracting a first dark image obtained in a state without radiation irradiation from an object image, thereby removing a dark component of the object image; an evaluation value obtaining unit configured to obtain an evaluation value by a varying dark component included in a corrected image that has undergone the correction processing based on the first dark image and a second dark image obtained after the first dark image; and a second correction unit configured to perform correction processing of removing the varying dark component from the corrected image based on the evaluation value.

17 Claims, 6 Drawing Sheets

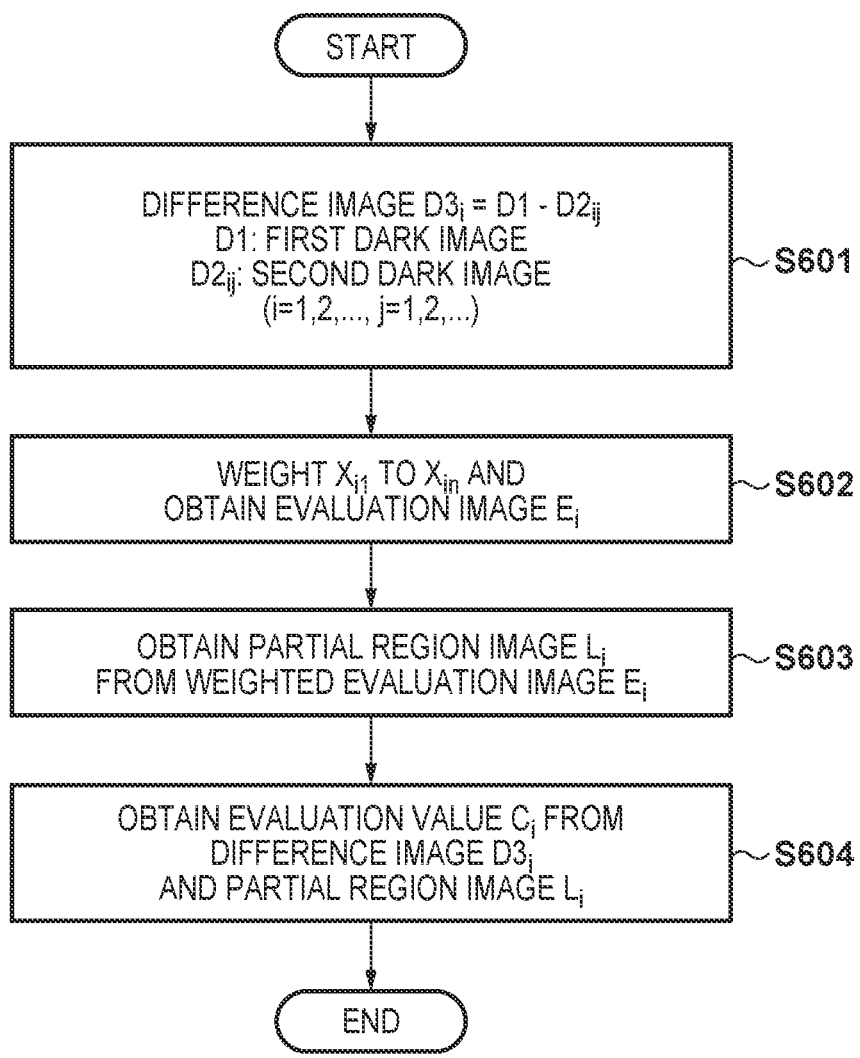

IMAGE PROCESSING APPARATUS, RADIATION IMAGING APPARATUS, IMAGE PROCESSING METHOD, AND STORAGE MEDIUM

BACKGROUND OF THE INVENTION

Field of the Invention

The present invention relates to an image processing apparatus, a radiation imaging apparatus, an image processing method, and a storage medium.

Description of the Related Art

In recent years, a radiation imaging apparatus that two-dimensionally arranges image sensors (detection units) made of amorphous silicon or single-crystal silicon and captures a radiation image has been put into practical use. In such a radiation imaging apparatus, as processing for reducing the influence of fixed pattern noise caused by the dark current and the like of the image sensors, dark correction processing of subtracting a dark image obtained in a state without radiation irradiation from an object image is performed.

Japanese Patent Laid-Open No. 2004-201784 proposes a technique of correcting the output of an image sensor, which has varied due to the influence of an increase/decrease in a dark current caused by a variation in the operating temperature or an image lag that occurs when capturing an object, based on fixed pattern noise (the fixed output component of the detection unit) obtained from the average value of dark images captured at a predetermined interval.

However, the technique of Japanese Patent Laid-Open No. 2004-201784 corrects the fixed pattern noise (the fixed output component of the detection unit) using the average value of dark images. For this reason, if the timing of obtaining a dark image at a predetermined interval is located after the previous object image capturing, an image lag that may occur in accordance with an input signal affects the correction result. For example, in correction processing, if the fixed output is estimated to be high due to an image lag, overcorrection may occur, and object information may be lost by the correction processing.

The present invention has been made in consideration of the above-described problem, and provides an image processing technique capable of correcting a varying dark component generated by an image lag in dark correction processing.

SUMMARY OF THE INVENTION

According to one aspect of the present invention, there is provided an image processing apparatus comprising: a first correction unit configured to perform correction processing of subtracting a first dark image obtained in a state without radiation irradiation from an object image, thereby removing a dark component of the object image; an evaluation value obtaining unit configured to obtain an evaluation value by a varying dark component included in a corrected image that has undergone the correction processing based on the first dark image and a second dark image obtained after the first dark image; and a second correction unit configured to perform correction processing of removing the varying dark component from the corrected image based on the evaluation value.

According to another aspect of the present invention, there is provided a radiation imaging apparatus comprising: a radiation generator configured to generate radiation; a detection unit configured to detect the radiation; and an image processing apparatus configured to process image data detected by the detection unit, the image processing apparatus comprising: a first correction unit configured to perform correction processing of subtracting a first dark image obtained in a state without radiation irradiation from an object image, thereby removing a dark component of the object image; an evaluation value obtaining unit configured to obtain an evaluation value by a varying dark component included in a corrected image that has undergone the correction processing based on the first dark image and a second dark image obtained after the first dark image; and a second correction unit configured to perform correction processing of removing the varying dark component from the corrected image based on the evaluation value.

According to still another aspect of the present invention, there is provided an image processing method comprising: performing correction processing of subtracting a first dark image obtained in a state without radiation irradiation from an object image, thereby removing a dark component of the object image; obtaining an evaluation value by a varying dark component included in a corrected image that has undergone the correction processing based on the first dark image and a second dark image obtained after the first dark image; and performing correction processing of removing the varying dark component from the corrected image based on the evaluation value.

According to yet another aspect of the present invention, there is provided a computer-readable storage medium storing a program that causes a computer to function as each unit of an image processing apparatus, the image processing apparatus comprising: a first correction unit configured to perform correction processing of subtracting a first dark image obtained in a state without radiation irradiation from an object image, thereby removing a dark component of the object image; an evaluation value obtaining unit configured to obtain an evaluation value by a varying dark component included in a corrected image that has undergone the correction processing based on the first dark image and a second dark image obtained after the first dark image; and a second correction unit configured to perform correction processing of removing the varying dark component from the corrected image based on the evaluation value.

According to the present invention, it is possible to provide an image processing technique capable of correcting a varying dark component generated by an image lag in dark correction processing.

According to the present invention, it is possible to provide an image processing technique capable of reducing a decrease in the contrast of an image or degradation in image quality caused by a loss of object information by correcting a varying dark component generated by an image lag in dark correction processing.

Further features of the present invention will become apparent from the following description of exemplary embodiments (with reference to the attached drawings).

BRIEF DESCRIPTION OF THE DRAWINGS

FIG. 6 is a flowchart for explaining the procedure of processing of an evaluation value obtaining unit according to the second embodiment.

DESCRIPTION OF THE EMBODIMENTS

Preferred embodiments of the present invention will now be described in detail with reference to the accompanying drawings. Note that the constituent elements described in the embodiments are merely examples. The technical scope of the present invention is determined by the scope of claims and is not limited by the following individual embodiments.

[First Embodiment]

(Arrangement of Radiation Imaging Apparatus 100)

Figure 1:
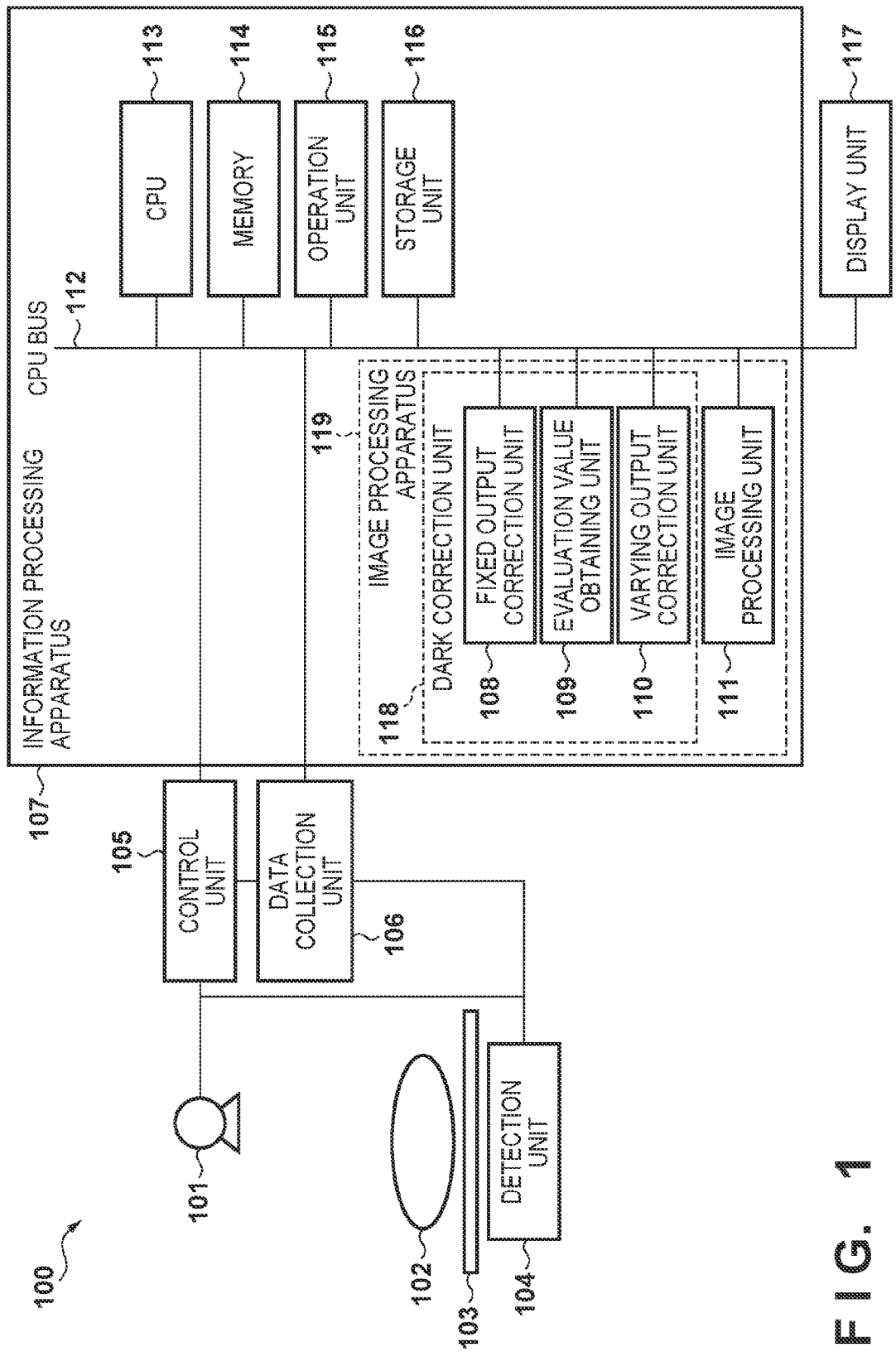
FIG. 1 is a block diagram showing an example of the arrangement of a radiation imaging apparatus according to an embodiment.

FIG. 1 is a block diagram showing the basic arrangement of a radiation imaging apparatus according to the first embodiment. The arrangement shown in FIG. 1 will also be referred to as a radiation imaging system. In this embodiment, radiation includes not only X-rays but also α-rays, β-rays, γ-rays, and the like that are beams generated by particles (including photons) emitted by radioactive decay, and additionally, beams having equivalent energy or more, for example, particle rays and cosmic rays.

The radiation imaging apparatus 100 includes a radiation generator 101 that generates radiation, a placement unit 103 (bed) used to place an object 102, and a detection unit 104 that detects radiation. The detection unit 104 outputs image data corresponding to radiation that has passed through the object 102. The detection unit 104 includes an image sensor in which, for example, solid-state image sensors made of amorphous silicon or single-crystal silicon are two-dimensionally arranged. The detection unit 104 converts the detected radiation into digital data, and outputs it as image data.

The radiation imaging apparatus 100 also includes a control unit 105, a data collection unit 106 that collects various kinds of data, an information processing apparatus 107 that performs image processing or control of the entire device in accordance with a user instruction, and a display unit 117 that displays an image output from the information processing apparatus 107. The information processing apparatus 107 includes the image processing apparatus 119 that processes image data detected by the detection unit.

The control unit 105 (control apparatus) can control the radiation generator 101, the detection unit 104, and the data collection unit 106 (data collection apparatus). The control unit 105 (control apparatus) controls the timing of radiation generation of the radiation generator 101 and the imaging conditions of the radiation generator 101. Under the control of the control unit 105, the detection unit 104 performs radiation detection processing in synchronism with the timing of radiation irradiation of the radiation generator 101, converts detected radiation into digital data, and outputs it as image data.

The data collection unit 106 (data collection apparatus) collects image data detected by the detection unit 104, and transmits the image data to the image processing apparatus 119. The data collection unit can thin image data pixels in accordance with a predetermined transmission rate and transmit the thinned image data to the image processing apparatus 119. For example, the transmission rate can be decided based on the ratio of all pixel data of the detection unit 104 and pixel data necessary for display of the display unit 117. For example, under the control of the control unit 105, the data collection unit 106 collects various kinds of digital data from the detection unit 104, and transmits the collected data to the image processing apparatus 119 in the information processing apparatus 107. The data collected by the data collection unit 106 is input to the image processing apparatus 119 (a dark correction unit 118 or an image processing unit 111) via a CPU bus 112 in the information processing apparatus 107.

The information processing apparatus 107 includes a CPU 113 that controls each constituent element, a memory 114 that temporarily stores various kinds of data, an operation unit 115, a storage unit 116 that stores various kinds of image data, and the image processing apparatus 119 (the dark correction unit 118 and the image processing unit 111). The constituent elements of the information processing apparatus 107 are electrically connected via the CPU bus 112 and can mutually transmit/receive data.

The memory 114 stores various kinds of data and programs necessary for processing of the CPU 113, and also includes a work memory for the operation of the CPU 113. The CPU 113 controls the operations of the information processing apparatus 107, the image processing apparatus 119, and the radiation imaging apparatus 100, and the like using the memory 114 in accordance with a user instruction input to the operation unit 115.

When the operation unit 115 receives a user instruction, an object is irradiated with radiation, and image obtaining is performed under the general control of the CPU 113. The radiation generator 101 irradiates the object 102 with radiation under predetermined imaging conditions, and the radiation that has passed through the object 102 is detected by the detection unit 104. The control unit 105 controls the imaging conditions such as a voltage, a current, and an irradiation time for the radiation generator 101. The radiation generator 101 generates radiation under predetermined imaging conditions. The information of the radiation detected by the detection unit 104 is converted into digital data and collected by the data collection unit 106 (data collection apparatus) as image data.

The image processing apparatus 119 includes the dark correction unit 118 and the image processing unit 111. The dark correction unit 118 includes, as functional components, a fixed output correction unit 108 (to be also referred to as a first correction unit hereinafter), an evaluation value obtaining unit 109, and a varying output correction unit 110 (to be also referred to as a second correction unit hereinafter). The fixed output correction unit 108 (first correction unit) performs correction processing of subtracting a first dark image obtained in a state without radiation irradiation from an object image, thereby removing the dark component of the object image. That is, the fixed output correction unit 108 subtracts a first dark image obtained in a state without radiation irradiation from an object image obtained in a state with radiation irradiation, thereby removing the fixed output component of the detection unit that detects radiation as a dark component included in the object image. Based on the first dark image and a second dark image obtained after the first dark image, the evaluation value obtaining unit 109 obtains an evaluation value by a varying dark component included in the corrected image that has undergone the correction processing. The varying dark component is the variation component of the dark component of the object image, which is the variation component of the fixed output of the detection unit. The evaluation value obtaining unit 109 obtains an evaluation value used to correct the varying dark component. The varying output correction unit 110

(second correction unit) performs correction processing of removing the varying dark component from the corrected image based on the evaluation value.

After an image collected by the data collection unit 106 and transmitted to the information processing apparatus 107 is input to the dark correction unit 118, the dark correction unit 118 performs dark correction for the image by the above-described functional components, and outputs the image data to which the dark correction has been applied.

A CCD or solid-state image sensor of the detection unit 104 made of amorphous silicon or single-crystal silicon accumulates charges based on a dark current even in a no-signal state without radiation irradiation as its characteristic. In the following explanation, "dark" means offsetting charges accumulated based on the dark current. A method of correcting the offset is called dark correction. An image obtained by capturing an object under radiation irradiation is called a captured image (object image), and an image captured without radiation irradiation is called a dark image. Detailed processing contents of dark correction by the fixed output correction unit 108 (first correction unit), the evaluation value obtaining unit 109, and the varying output correction unit 110 (second correction unit) will be described later.

Image data dark-corrected by the dark correction unit 118 is input to the image processing unit 111. The image processing unit 111 performs preprocessing such as gain correction and defect correction, and after that, applies noise reduction processing, various kinds of enhancement processing, and tone conversion processing, and outputs image data used for diagnosis. Any known processing is usable as image processing to be performed by the image processing unit 111. Note that in this embodiment, the dark correction unit 118 is mounted on the information processing apparatus 107. However, the embodiment is not limited to this arrangement. For example, the dark correction unit 118 may be independent of the information processing apparatus 107, or a CPU and memories dedicated to the dark correction apparatus may be provided. The arrangements of the dark correction unit 118 and the image processing unit 111 may be provided in the data collection unit 106 or the control unit 105, and the data collection unit 106 or the control unit 105 may execute dark correction processing or image processing.

(Operation of Radiation Imaging Apparatus 100)

The operation of the radiation imaging apparatus 100 will be described next with reference to FIG. 2. First, in step S201, the radiation imaging apparatus 100 captures a first dark image under the control of the control unit 105. The detection unit 104 performs a charge accumulation operation in a state without radiation irradiation (non-exposure state), and outputs an image based on the accumulated charges as a dark image. The dark image is an image including fixed pattern noise (the fixed output component of the detection unit) caused by the dark current and the like of the solid-state image sensors. The data collection unit 106 collects the dark image including the fixed pattern noise (the fixed output component of the detection unit). The data collection unit 106 transmits the collected dark image to the information processing apparatus 107. The dark image transmitted by the data collection unit 106 is transferred to the storage unit 116 via the CPU bus 112 and saved. The first dark image obtained in step S201 is used to remove basic fixed pattern noise (the fixed output component of the detection unit) from an object image (used in first dark correction processing of step S204 to be described later). The first dark image needs to be captured at the same resolution as the object image because it is used in first dark correction processing.

To reduce the influence of noise included in the dark image, the radiation imaging apparatus 100 can capture a plurality of dark images (first dark images), average the characteristics of the plurality of captured dark images, and use the result for first dark correction processing of step S204 to be described later.

The amount of fixed pattern noise (the fixed output component of the detection unit) is known to vary depending on the accumulation time at the time of imaging. For this reason, a case in which the object image capturing time (charge accumulation time) is not constant because of the difference in the operation mode or frame rate at the time of imaging may occur as in a case in which, for example, a moving image capturing is performed. In this case, dark images (first dark images) corresponding to a plurality of different accumulation times may be captured and saved in the storage unit 116 in this step. In this case, the fixed output correction unit 108 (first correction unit) obtains information representing imaging conditions such as an operation mode and a frame rate at the time of imaging from the control unit 105. The fixed output correction unit 108 (first correction unit) can obtain dark images corresponding to the imaging conditions from the storage unit 116 and use them in first dark correction processing (step S204).

In step S202, the radiation imaging apparatus 100 captures a second dark image after the first dark image under the control of the control unit 105. The operation of the detection unit 104 associated with the imaging is the same as in step S201. However, as the characteristic of this operation, the second dark image obtaining operation is intermittently executed during the time from the first dark image capturing in step S201 to object image capturing in step S203. The radiation imaging apparatus 100 can perform the intermittent obtaining operation at a predetermined time interval (for example, on a second basis). The CPU 113 can arbitrarily set the time interval. The second dark image is obtained based on the time interval set by the CPU 113.

Note that the second dark image obtained in step S202 is used to additionally correct the variation component of the fixed pattern noise (the variation component of the fixed output component of the detection unit) (used in second dark correction processing of step S208 to be described later). The object image capturing interval (imaging timing) changes depending on the use method of the user, and therefore, cannot be controlled on the side of the radiation imaging apparatus 100. For this reason, the second dark image needs to be obtained as easily as possible in a short time.

In this step, the data collection unit 106 controls data transmission to the information processing apparatus 107, thereby transmitting information necessary for the processes of steps S205 to S207 to be described later to the information processing apparatus 107. The data collection unit 106 can execute data transmission processing at a high speed by, for example, thinning image data to 1/N (N is an integer of 2 or more) and then transmitting it to the information processing apparatus 107 or setting only one type of accumulation time at the time of obtaining.

To thin the image, various techniques can be used. The data collection unit 106 can decide the transmission rate based on the ratio of all pixel data of the detection unit 104 and pixel data necessary for display of the display unit 117. For example, assume that the total number of pixels of two-dimensional solid-state image sensors is 2688×2688, and the number of displayable pixels of the display unit 117 whose display is controlled by the CPU 113 in the information processing apparatus 107 is 336×336. In this case, the data collection unit 106 can thin image data to ⅛ (=336/2688) and transmit it to the information processing apparatus 107 such that the correction result can be confirmed on the display unit 117.

Even in imaging using a grid to suppress scattered radiation, the data collection unit 106 can control image data thinning and transmit data so as to cope with moiré that is generated on an image due to interference between the grid density and the pixel pitch of the detection unit 104. The thinned image data is transferred to the storage unit 116 via the CPU bus 112 and stored in it under the control of the CPU 113.

In step S203, the radiation imaging apparatus 100 captures an object image. According to a user instruction input via the operation unit 115, the control unit 105 controls to synchronously perform the radiation irradiation operation of the radiation generator 101 and the accumulation operation of the detection unit 104. Object image data captured by the detection unit 104 is collected by the data collection unit 106. The data collection unit 106 transmits the collected object image data to the information processing apparatus 107. The transmitted object image data is input to the image processing apparatus 119 via the CPU bus 112 under the control of the CPU 113.

In step S204, the fixed output correction unit 108 (first correction unit) performs first dark correction processing. That is, the fixed output correction unit 108 (first correction unit) performs correction processing of subtracting the first dark image obtained in a state without radiation irradiation from the object image, thereby removing the dark component of the object image. The fixed output correction unit 108 (first correction unit) subtracts the first dark image from the object image obtained in a state with radiation irradiation, thereby removing the fixed output component of the detection unit included in the object image. More specifically, the fixed output correction unit 108 (first correction unit) performs processing of subtracting the first dark image obtained in step S201 from the object image obtained in step S203, thereby removing fixed pattern noise (the fixed output component of the detection unit). By the first dark correction processing, the basic fixed pattern noise (the fixed output component of the detection unit) is removed from the object image. However, the process of this step cannot correct the variation component of the fixed pattern noise (the variation component of the fixed output component of the detection unit) that varies during the time from the dark image capturing to the object image capturing. For this reason, the variation component of the fixed pattern noise remains in the image (corrected image) after the first dark correction processing.

In step S205, the evaluation value obtaining unit 109 performs processing of analyzing the first dark image, the second dark images, and the object images captured up to this time and obtaining an evaluation value used to correct a varying dark component (the variation component of the fixed output of the detection unit 104) included in the corrected image. Note that detailed processing of the evaluation value obtaining unit 109 will be described later.

In step S206, the varying output correction unit 110 (second correction unit) performs second dark correction processing. The varying output correction unit 110 (second correction unit) performs correction processing of removing the varying dark component from the corrected image based on the obtained evaluation value. That is, the varying output correction unit 110 (second correction unit) further performs second dark correction processing for the image (corrected image) after the first dark correction processing based on the evaluation value obtained in step S205. More specifically, the varying output correction unit 110 (second correction unit) performs correction processing of subtracting the evaluation value obtained in step S205 from the image (corrected image) after the first dark correction processing of step S204, thereby removing the varying dark component (the variation component of the fixed output of the detection unit 104). By the second dark correction processing, the varying dark component is removed from the image (corrected image) after the first dark correction processing. Note that detailed processing of the varying output correction unit 110 (second correction unit) will be described later.

In step S207, the CPU 113 determines whether a radiation irradiation instruction is continuously input via the operation unit 115. If a radiation irradiation instruction is continuously input (YES in step S207), the process returns to step S203, and the radiation imaging apparatus 100 continuously executes object image capturing under the control of the control unit 105. On the other hand, upon determining in step S207 that a radiation irradiation instruction is not continuously input (NO in step S207), the process advances to step S208.

After the series of imaging operations are completed, in step S208, the CPU 113 determines based on imaging technique information for the subject whether to continue the imaging enable state of the radiation imaging apparatus 100. For example, if the imaging technique for the subject is not completed, the CPU 113 determines to continue the imaging enable state (YES in step S208), and returns the process to step S202. In step S202, the radiation imaging apparatus 100 performs the operation of intermittently capturing a second dark image under the control of the control unit 105. After step S202, the same processing as described above is repeated.

Upon determining in step S208 to power off the apparatus because the imaging technique for the subject has ended, and the use of the apparatus is completed, the CPU 113 determines not to continue the imaging enable state (NO in step S208), and the processing ends. When the radiation imaging apparatus 100 is reactivated next, the processing is performed again from the first dark image capturing of step S201.

(Processing of Evaluation Value Obtaining Unit 109)

Detailed processing of the evaluation value obtaining unit 109 in step S205 of FIG. 2 will be described next. In this processing, the evaluation value obtaining unit 109 generates the histogram of the output values of the detection unit for a difference image obtained by the difference between the second dark image and the first dark image. The evaluation value obtaining unit 109 classifies the histogram distribution by clustering processing, and based on the classification result, obtains an evaluation value used to remove the varying dark component included in the corrected image. That is, based on the classification result, the evaluation value obtaining unit 109 obtains an evaluation value used to remove the variation component of the fixed output of the detection unit 104 included in the corrected image. The processing of the evaluation value obtaining unit 109 will be described in detail with reference to FIG. 3.

Figure 3:
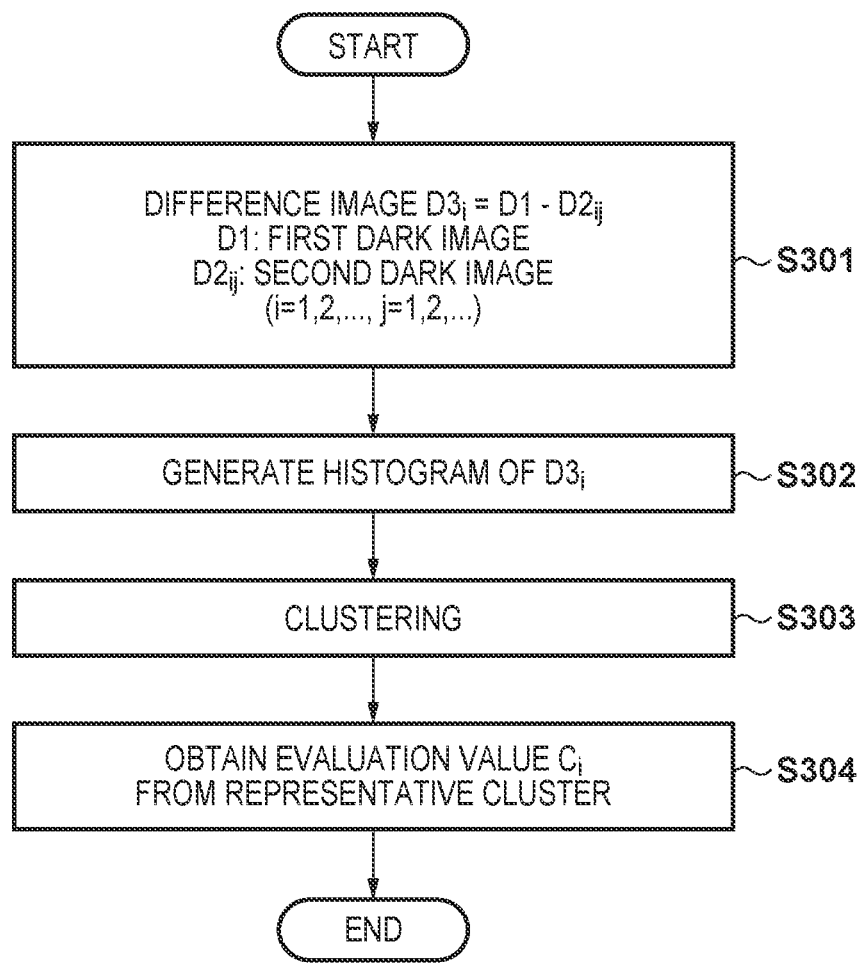
FIG. 3 is a flowchart for explaining the procedure of processing of an evaluation value obtaining unit according to the first embodiment.

FIG. 3 is a flowchart of processing performed by the evaluation value obtaining unit 109. In step S301, the evaluation value obtaining unit 109 performs subtraction (difference calculation) between a first dark image D1 and a second dark image $D2_{ij}$, thereby obtaining a difference image $D3_i$. Here, a coefficient i indicates that an image is obtained at a timing before ith object image capturing is performed after the start of the imaging sequence, and a coefficient j indicates that j images are obtained at a certain timing. As the second dark image used to obtain the difference image $D3_i$, the evaluation value obtaining unit 109 can use an image obtained immediately before capturing an object image including a lot of pieces of fixed pattern noise variation information during the time from capturing of the first dark image D1 to capturing of the object image.

Figure 4:
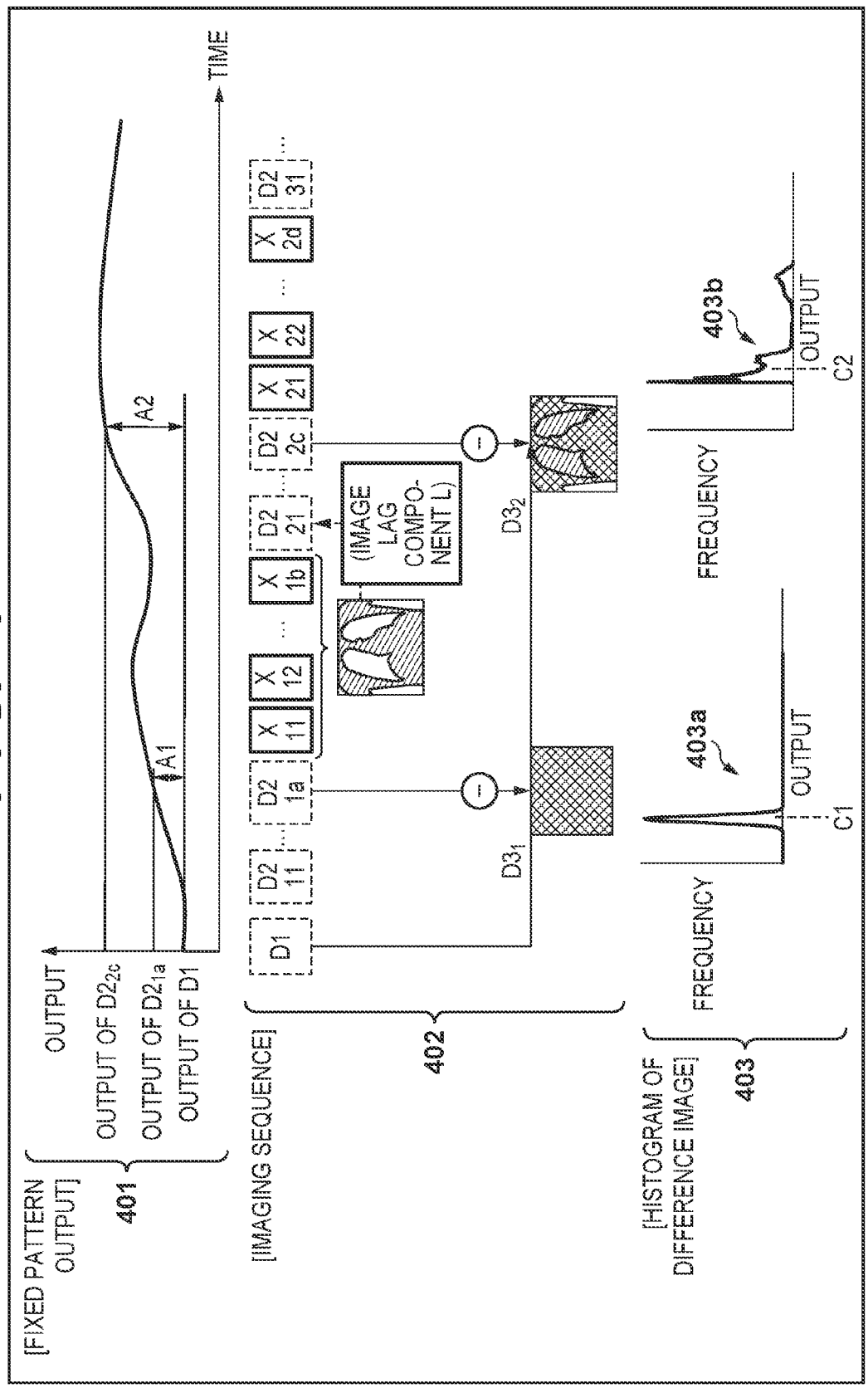
FIG. 4 is a view for explaining the processing of the evaluation value obtaining unit.

FIG. 4 is a view for explaining the processing of the evaluation value obtaining unit 109 in detail. In the detailed example shown in FIG. 4, coefficient i =1, 2. Referring to FIG. 4, a fixed pattern output 401 is an example of the output (fixed pattern output) of fixed pattern noise (the fixed output component of the detection unit). Reference numeral 402 represents a sequence of imaging the first dark image D1, the second dark image $D2_{ij}$, and the object image.

Figure 2:
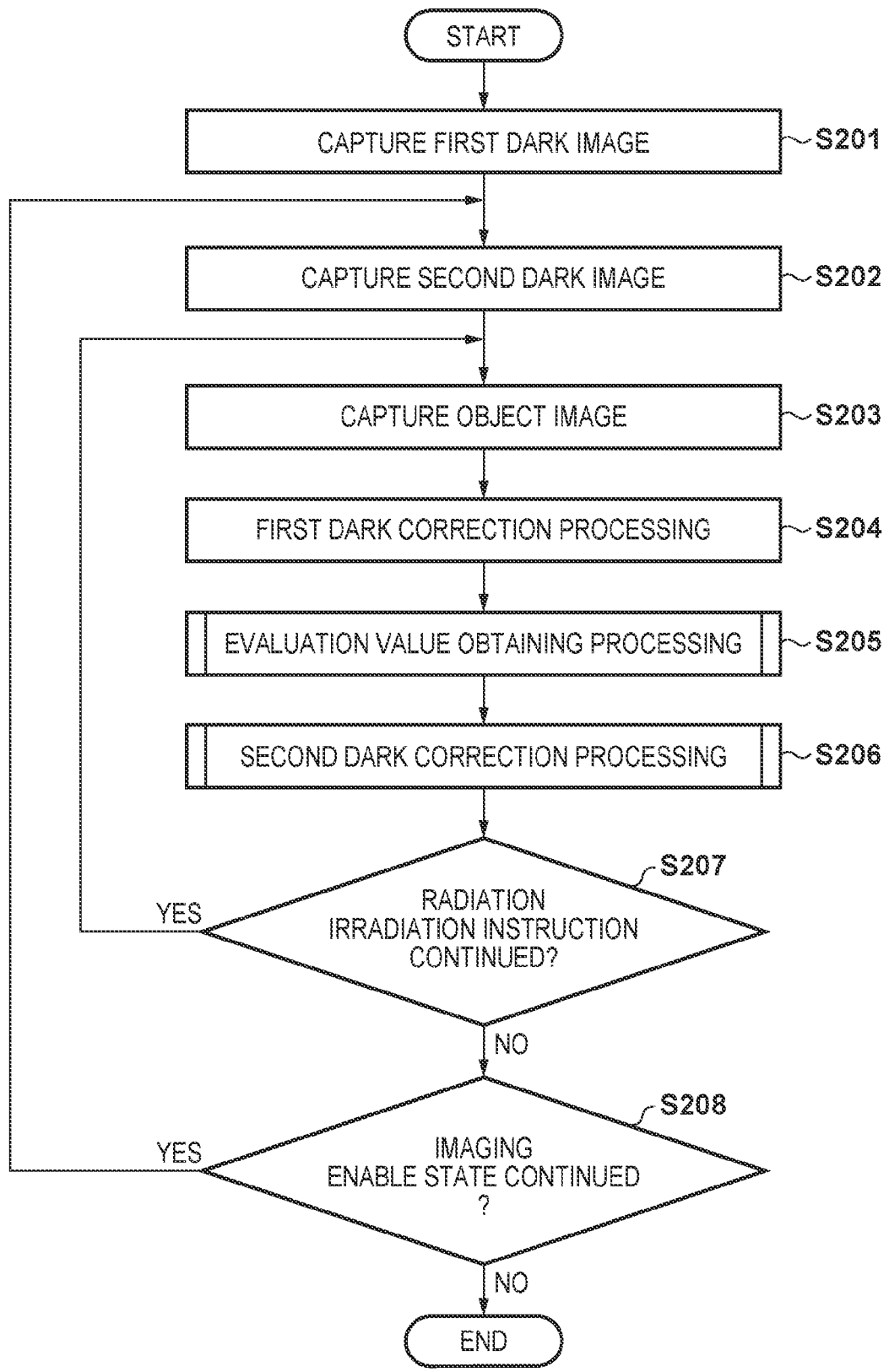
FIG. 2 is a flowchart for explaining the procedure of processing of the radiation imaging apparatus according to the first embodiment.

As indicated by the imaging sequence 402, after the first dark image D1 is captured for the first time (step S201 in FIG. 2), a second dark images $D2_{11}$ to $D2_{1a}$ are intermittently obtained until an object image capturing instruction is received (step S202 in FIG. 2). After that, object image capturing is started, and b object images $X_{11}$ to $X_{1b}$ are captured until the end of the imaging instruction (step S203 and YES in step S207 in FIG. 2). If the object image capturing ends without continuing a radiation irradiation instruction, and the imaging enable state is to be further continued, second dark image capturing processing is performed (NO in step S207, YES in step S208, and step S202 in FIG. 2).

The, c second dark images $D2_{21}$ to $D2_{2c}$ are obtained. In the imaging sequence 402, object image capturing is then started, and d object images $X_{21}$ to $X_{2d}$ are captured until the end of the imaging instruction (step S203 and YES in step S207 in FIG. 2). In a similar manner, second dark images $D2_{31}$, . . . are obtained.

The fixed pattern output 401 exemplarily shows a state in which the fixed pattern noise of the detection unit 104 (the fixed output component of the detection unit) varies over time due to a change in the temperature or the like. Here, the variation amount of fixed pattern noise (the variation amount of the fixed output component of the detection unit 104) at the timing of obtaining the second dark image $D2_{1a}$ is A1. In addition, the variation amount of fixed pattern noise (the variation amount of the fixed output component of the detection unit 104) at the timing of obtaining the second dark image $D2_{2c}$ is A2. The variation amount of the fixed pattern noise increases from A1 to A2 (A2>A1) along with the elapse to time. To appropriately correct the variation amount of the fixed pattern noise and reduce the influence on the contrast of an image, it is important to correctly estimate the variation amounts A1 and A2 of the fixed pattern noise.

The evaluation value obtaining unit 109 calculates the difference between the first dark image D1 and the second dark image $D2_{1a}$ obtained at the timing before object image capturing is performed, thereby obtaining a difference image $D3_1$. As indicated by the difference image $D3_1$ shown in FIG. 4, the difference image using the second dark image $D2_{1a}$ obtained at the timing before object image capturing is performed almost includes only the information of the variation in the fixed pattern noise.

Depending on various use cases of the radiation imaging apparatus 100, a case in which object image capturing is performed before obtaining of a second dark image D2 can also be assumed. An image lag component of radiation may be superimposed on the second dark image depending on object image imaging conditions. For example, in an imaging region where a region without an object is directly continuously irradiated with radiation, as in capturing of the chest of an object, an image lag component L may be generated and superimposed on the signal of the second dark image D2.

In this case, if the evaluation value obtaining unit 109 obtains a difference image $D3_2$ by calculating the difference between the first dark image D1 and the second dark image $D2_{2c}$, like the difference image $D3_1$, the difference image $D3_2$ may be obtained in a state in which not only the variation amount A2 of the fixed pattern noise (the variation amount of the fixed output component of the detection unit 104) that should be obtained but also the signal of the image lag component L is superimposed. In this embodiment, the evaluation value obtaining unit 109 obtains the variation amount A2 of the fixed pattern noise without superimposition of the image lag component L by the following processing.

Referring back to FIG. 3, in step S302, the evaluation value obtaining unit 109 generates the histogram of the difference image $D3_i$ obtained in step S301. Reference numeral 403 in FIG. 4 indicates the histogram of the difference image. The abscissa of the histogram represents the output value of the fixed pattern noise of each pixel included in the difference image $D3_i$, and the ordinate represents the frequency. In the example of FIG. 4, a histogram 403a is the histogram of the difference image $D3_1$, and a histogram 403b is the histogram of the difference image $D3_2$.

In the histogram 403a of the difference image $D3_1$, the image lag component L is not superimposed on the variation amount A1 of the fixed pattern noise. Hence, one cluster (peak) derived from the variation amount A1 of the fixed pattern noise (the variation amount of the fixed output component of the detection unit 104) is generated in the frequency distribution. On the other hand, in the histogram 403b of the difference image $D3_2$, the image lag component L is superimposed on the variation amount A2 of the fixed pattern noise (the variation amount of the fixed output component of the detection unit 104). For this reason, the frequency distribution of the histogram 403b has a cluster (peak) derived from the variation amount A2 of the fixed pattern noise and a cluster (peak) derived from the image lag component L.

In step S303, the evaluation value obtaining unit 109 clusters the histogram of the difference image $D3_i$. As described above, not only the cluster of the variation amount of the fixed pattern noise but also a cluster derived from the image lag component may be superimposed on the histogram of the difference image $D3_i$. Since the image lag component L is added to the output component of the fixed pattern noise, the image lag component L is assumed to have, on the histogram, a distribution of output values higher than the output value of the fixed pattern noise. Using this characteristic, the evaluation value obtaining unit 109 performs processing of estimating the information of the variation amount of the fixed pattern noise from the histogram of the difference image.

Figure 5:
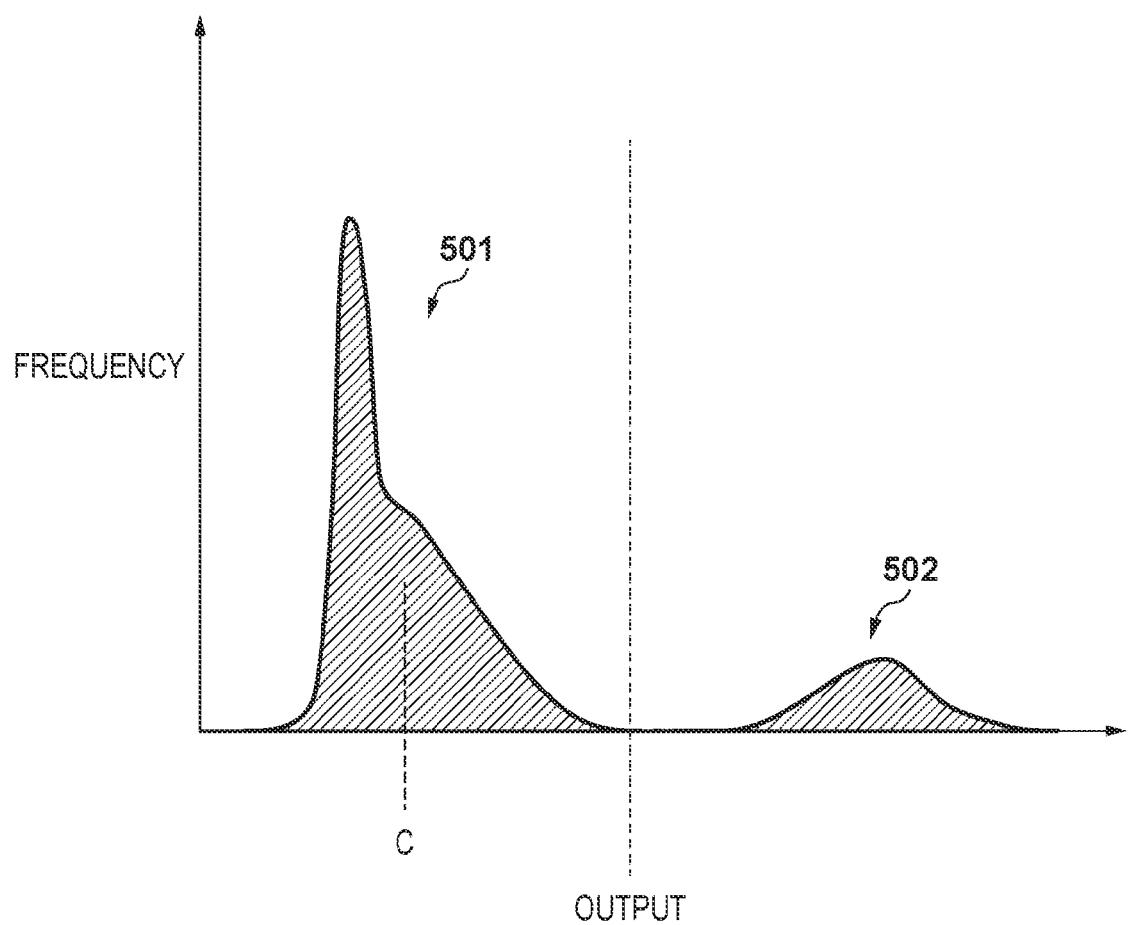
FIG. 5 is a graph showing an example of the histogram of a difference image.

FIG. 5 is a graph showing an example of the histogram of the difference image. Based on the result of clustering processing, the evaluation value obtaining unit 109 can classify the histogram of the difference image into a first cluster 501 belonging to a group of small outputs and a second cluster 502 belonging to a group of other outputs.

The fixed pattern noise is known to vary in accordance with an increase/decrease in the dark current caused by a variation in the operating temperature of the detection unit 104 or the influence of, for example, an image lag generated at the time of object image capturing. The first cluster 501 shown in FIG. 5 corresponds to a variation in the fixed pattern noise based on an increase/decrease in the dark current caused by a variation in the operating temperature of the detection unit 104. The second cluster 502 corresponds to a variation in the fixed pattern noise based on the influence of, for example, an image lag generated at the time of object image capturing.

As the clustering method, the evaluation value obtaining unit 109 can, for example, binarize the output values of the difference image using discriminant analysis, classify smaller values out of the binarization results into the first cluster 501, and classify larger values out of the binarization results into the second cluster 502.

Alternatively, the evaluation value obtaining unit 109 can also classify the histogram of the difference image into a plurality of clusters using a Gaussian mixture model. The evaluation value obtaining unit 109 can also classify clusters of smaller outputs out of the plurality of clusters into the first cluster 501 and the remaining clusters into the second cluster 502. Note that the clustering methods used by the evaluation value obtaining unit 109 are not limited to those described above. The evaluation value obtaining unit 109 can cluster the histogram of the difference image $D3_i$ by applying various methods.

In step S304, the evaluation value obtaining unit 109 performs processing of obtaining an evaluation value $C_i$ that estimates the variation amount of the fixed pattern noise from the classified clusters. The evaluation value obtaining unit 109 obtains, as the evaluation value, a median C of the first cluster 501 (representative cluster) classified in step S303.

If the distribution of the histogram has one cluster as the result of classification by the clustering processing, the evaluation value obtaining unit 109 obtains the median of the cluster as the evaluation value. If the distribution of the histogram has a plurality of clusters as the result of classification by the clustering processing, the evaluation value obtaining unit 109 obtains the median of the cluster of smaller output values out of the plurality of clusters as the evaluation value. For example, the histogram 403a shown in FIG. 4 has one cluster, and the evaluation value obtaining unit 109 obtains a median C1 of the cluster of the histogram 403a as the evaluation value. In the histogram 403b, the evaluation value obtaining unit 109 obtains a median C2 of the cluster of smaller output values out of the plurality of classified clusters as the evaluation value. The processing of the evaluation value obtaining unit 109 thus ends. By the clustering processing, the evaluation value obtaining unit 109 classifies the distribution of the histogram into a first distribution corresponding to the varying dark component based on the variation in the operating temperature of the detection unit and a second distribution corresponding to the varying dark component based on the influence of an image lag generated at the time of object image capturing. Based on the first distribution, the evaluation value obtaining unit 109 can obtain the evaluation value used to remove the varying dark component included in the corrected image. That is, based on the first distribution, the evaluation value obtaining unit 109 can obtain the evaluation value used to correct the variation component of the fixed output of the detection unit 104, which is included in the corrected image.

(Processing of Varying Output Correction Unit 110)

Detailed processing of the varying output correction unit 110 (second correction unit) in step S206 of FIG. 2 will be described next. If the evaluation value is smaller than a threshold, the varying output correction unit 110 (second correction unit) performs correction processing of subtracting the evaluation value from the image corrected by the fixed output correction unit (first correction unit), thereby removing the varying dark component (the variation component of the fixed output of the detection unit 104) included in the corrected image. If the evaluation value is equal to or larger than the threshold, the varying output correction unit 110 (second correction unit) multiplies the dark component (the fixed output component of the detection unit) of the first dark image by a coefficient based on the evaluation value, thereby obtaining the variation amount (the variation amount of the fixed output component of the detection unit) of the dark component of the first dark image. Then, the varying output correction unit 110 (second correction unit) performs correction processing of subtracting the obtained variation amount of the dark component from the image corrected by the fixed output correction unit (first correction unit), thereby removing the varying dark component (the variation component of the fixed output of the detection unit 104) included in the corrected image.

More specifically, the varying output correction unit 110 (second correction unit) executes the following processing. That is, based on the evaluation value $C_i$ obtained by the evaluation value obtaining unit 109, the varying output correction unit 110 performs second dark correction processing for an image ($X_{ij}$–D1) after the first dark correction processing by $$\begin{cases} procX_{ij} = X_{ij} - D1 - Ci & (Ci < Th) \\ procX_{ij} = X_{ij} - D1 - \dfrac{D1 \times Ci}{C1} & (Ci \geq Th) \end{cases} \quad (1)$$

$$(i = 1, 2, \ldots, j = 1, 2, \ldots)$$

where $X_{ij}$ is the object image, and D1 is the first dark image. $X_{ij}$–D1 represents the image (corrected image) after the first dark correction processing, which is obtained by subtracting the first dark image from the object image.

C1 is the evaluation value obtained by performing the processing of the evaluation value obtaining unit 109 for the first dark image D1. This evaluation value is a value corresponding to, for example, the evaluation value C1 of the histogram 403a shown in FIG. 4.

The coefficient i indicates that ith object image capturing is performed after the start of the imaging sequence, and the coefficient j indicates that j object images are obtained at a certain timing. $procX_{ij}$ indicates an image that has undergone the second dark correction processing. A threshold Th is information that changes depending on the characteristic of the detection unit 104. The threshold Th can be obtained by measurement in advance and set in the memory 114.

When executing second dark correction processing, the varying output correction unit 110 (second correction unit) obtains the threshold Th from the memory 114 and compares the evaluation value $C_i$ and the threshold Th. Based on the comparison result, the varying output correction unit 110 (second correction unit) performs second dark correction processing by equation (1).

The correction target of this processing is the varying dark component (the variation component of the fixed output of the detection unit). Considering the variation pattern of fixed pattern noise, if the variation amount is small (smaller than the threshold), the variation amount can be estimated to have a predetermined value almost in the entire image, and the image can satisfactorily be corrected by evenly subtracting the evaluation value $C_i$ in the image. That is, if the evaluation value is smaller than the threshold, the varying output correction unit (second correction unit) corrects the varying dark component included in the corrected image by subtracting the evaluation value from the image corrected by the fixed output correction unit (first correction unit).

On the other hand, if the variation amount is large (equal to or larger than the threshold), the influence of an increase/decrease of the fixed pattern noise in the entire image becomes large. For this reason, if the evaluation value is only evenly subtracted, the fixed pattern noise may remain in the image. If the evaluation value is equal to or larger than the threshold, the varying output correction unit (second correction unit) multiplies the dark component (the fixed output component of the detection unit) of the first dark image by a coefficient based on the evaluation value, thereby obtaining the variation amount (the variation amount of the fixed output component of the detection unit) of the dark component of the first dark image. Then, the varying output correction unit (second correction unit) performs correction processing of subtracting the obtained variation amount (the variation amount of the fixed output component of the detection unit) of the dark component from the image corrected by the fixed output correction unit (first correction unit), thereby removing the varying dark component (the variation component of the fixed output of the detection unit) included in the corrected image. More specifically, the varying output correction unit 110 (second correction unit) multiplies the fixed pattern noise output (dark component) of the first dark image by a coefficient ($C_i$/C1) based on the evaluation value, thereby obtaining the variation amount (the variation amount of the fixed output component of the detection unit) of the fixed pattern noise output (dark component) of the first dark image D1. Then, the varying output correction unit 110 (second correction unit) corrects the image ($X_{ij}$–D1) after the first dark correction processing based on the obtained variation amount (D1×$C_i$/C1) of the fixed pattern noise of the first dark image D1. That is, the varying output correction unit (second correction unit) performs correction processing of subtracting the obtained variation amount (D1×$C_i$/C1) of the fixed output component from the image ($X_{ij}$–D1) corrected by the fixed output correction unit (first correction unit), thereby removing the varying dark component included in the corrected image after the first dark correction processing.

As described above, according to this embodiment, even if the fixed output component of the detection unit varies during the time from dark image capturing to object image capturing, the influence of the variation in the fixed output component can be corrected. A decrease in the contrast of an image or degradation in image quality caused by a loss of object information can be reduced by correcting the variation in the fixed output of the detection unit. That is, according to this embodiment, it is possible to correct a varying dark component generated by an image lag in dark correction processing. In addition, it is possible to reduce a decrease in the contrast of an image or degradation in image quality caused by a loss of object information by correcting a varying dark component generated by an image lag in dark correction processing.

(Modification of Processing of Varying Output Correction Unit 110)

The varying output correction unit 110 (second correction unit) can also obtain the peak value of a second distribution that is classified by the clustering processing of the evaluation value obtaining unit 109 and corresponds to the variation component of the fixed output of the detection unit based on the influence of the image lag generated at the time of object image capturing, and compare it with a threshold. The second distribution (for example, 502 in FIG. 5) is formed based on the influence of the image lag generated at the time of object image capturing, and attenuates along with the elapse of time as a characteristic.

The varying output correction unit 110 (second correction unit) executes comparison processing of the threshold and the peak value of the second distribution at a timing after the histogram creation. If the peak value of the second distribution is equal to or larger than the threshold, the varying output correction unit 110 (second correction unit) can estimate a region corresponding to the image lag component by applying a known technique for region estimation. Based on the estimation result, the varying output correction unit 110 (second correction unit) can perform correction processing (third dark correction processing) of removing the image lag component from the image that has undergone the first dark correction processing (step S204) and the second dark correction processing (step S206).

This makes it possible to eliminate the influence of an image lag component in an early stage before the image lag component attenuates along with the elapse of time and becomes smaller than the threshold and improve the throughput of the apparatus while reducing a decrease in the contrast of the image caused by the influence of the image lag component.

[Second Embodiment]

The arrangement of an image processing apparatus according to the second embodiment will be described next. The basic arrangement of the apparatus according to this embodiment is shown in FIG. 1, as in the first embodiment. A processing procedure according to this embodiment is also common to the first embodiment in many points. Hence, a detailed description of overlapping arrangements and processes will be omitted, and points of difference from the first embodiment will mainly be described.

In the image processing apparatus according to the second embodiment, processing of an evaluation value obtaining unit 109 in a dark correction unit 118 is different from the processing of the evaluation value obtaining unit 109 described in the first embodiment. The processing of the evaluation value obtaining unit 109 according to the second embodiment will be described below with reference to FIG. 6.

First, in step S601, the evaluation value obtaining unit 109 obtains a difference image by the difference between the second dark image and the first dark image. The evaluation value obtaining unit 109 performs subtraction (difference calculation) between a first dark image D1 and a second dark image D2$_{ij}$ thereby obtaining a difference image D3$_i$. Here, a coefficient i indicates that ith object image capturing is performed after the start of the imaging sequence, and a coefficient j indicates that j images are obtained at a certain timing.

In step S602, the evaluation value obtaining unit 109 multiplies each of a plurality of object images by a weight coefficient representing the tendency of a varying dark component (the variation component of the fixed output of a detection unit), and generates an evaluation image by adding the multiplication results. More specifically, the evaluation value obtaining unit 109 multiplies an object image $X_{ij}$ by a weight coefficient $\alpha_j$ and adds multiplication results, thereby obtaining a weighted evaluation image $E_i$ by $$E_i = \sum_{j=1}^{n} \alpha_j X_{ij} \quad (2)$$

The weight coefficient $\alpha_j$ when n object images are captured is a weight coefficient representing the tendency of a varying dark component (the variation component of the fixed output of the detection unit) for each of a plurality of object images and is given by $$\alpha_j = A\exp\left\{-\frac{k(n-j)}{s}\right\} \quad (3)$$

where A is an arbitrary constant, k is the attenuation coefficient, and s is the frame rate at the time of object image capturing. As a characteristic, an image lag readily occurs when a signal input to a detection unit 104 at the time of object image capturing is large and continues for a long time. The image lag attenuates along with the elapse of time as another characteristic.

The weighted evaluation image $E_i$ is obtained by weighting and adding the signals of object images input in a series of imaging operations in accordance with the attenuation of the image lag, and can be handled as an evaluation image that represents the easiness to generate an image lag upon capturing a series of object images $X_{i1}$ to $X_{jn}$ as a numerical value. The various kinds of coefficient information described above are determined by the characteristic of the detection unit 104. The various kinds of coefficient information can be obtained in advance by measurement and set in a memory 114.

In step S603, the evaluation value obtaining unit 109 obtains a partial region image in which the output value of the evaluation image is smaller than a threshold. For example, to obtain an evaluation value from the weighted evaluation image $E_i$, the evaluation value obtaining unit 109 obtains a partial region image $L_i$ in which an image lag generation amount is assumed to be small. To obtain the partial region image $L_i$, for example, a specific threshold Thi is set in advance. The evaluation value obtaining unit 109 compares the threshold Thi with the output value of each pixel of the weighted evaluation image $E_i$. Based on the comparison result, the evaluation value obtaining unit 109 can obtain a coordinate group of pixels in which the output value of each pixel of the weighted evaluation image $E_i$<threshold Thi as the partial region image $L_i$.

Alternatively, the evaluation value obtaining unit 109 may determine the magnitude order of the output values of the pixels of the evaluation image, and based on the determination result, obtain a partial region image formed from a predetermined ratio of pixels in ascending order of the output values. For example, the evaluation value obtaining unit 109 may determine the magnitude order of the output values of the pixels of the weighted evaluation image $E_i$, and based on the determination result, obtain a coordinate group of pixels of N % from the lower side (for example, 10% from the lower side) in ascending order of output values as the partial region image $L_i$.

In step S604, the evaluation value obtaining unit 109 obtains an evaluation value $C_i$ from the difference image $D3_i$ and the partial region image $L_i$. The evaluation value obtaining unit 109 obtains, based on the coordinate information of the partial region image, a portion corresponding to the partial region image in the difference image obtained by the difference between the second dark image and the first dark image, and obtains the average value of the output values of the pixels in the obtained region as the evaluation value. More specifically, the evaluation value obtaining unit 109 obtains a portion corresponding to the partial region image $L_i$ in the difference image $D3_i$, and obtains the average value of the outputs of the pixels in the obtained portion as the evaluation value. The processing of the evaluation value obtaining unit 109 according to this embodiment thus ends.

Based on the evaluation value $C_i$ obtained by the evaluation value obtaining unit 109, a varying output correction unit 110 (second correction unit) performs second dark correction processing by equation (1) described in the first embodiment for the image ($X_{ij}$–D1) after the first dark correction processing.

According to this embodiment, it is possible to obtain an evaluation value by more precisely separating the fixed pattern noise output and the influence of an image lag and performing second dark correction processing, in addition to the effects obtained in the first embodiment.

The embodiments of the present invention have been described above. The present invention is not limited to these embodiments, as a matter of course, and various changes and modifications can be made within the spirit and scope of the present invention. In addition, the present invention can take a form of, for example, a system, an apparatus, a method, a program, or a storage medium. More specifically, the present invention may be applied to a system constituted by a plurality of devices, or to an apparatus constituted by a single device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-119710, filed Jun. 12, 2015, which is hereby incorporated by reference herein in its entirety.

What is claimed is:

1. An image processing apparatus comprising:
a first correction unit configured to perform correction processing of subtracting a first dark image obtained in a state without radiation irradiation from an object image, thereby removing a dark component of the object image;
an evaluation value obtaining unit configured to obtain an evaluation value by a varying dark component included in a corrected image that has undergone the correction processing based on the first dark image and a second dark image obtained after the first dark image; and
a second correction unit configured to perform correction processing of removing the varying dark component from the corrected image based on the evaluation value.

2. The apparatus according to claim 1, wherein if the evaluation value is smaller than a threshold, the second correction unit performs the correction processing of removing the varying dark component included in the corrected image by subtracting the evaluation value from the corrected image corrected by the first correction unit.

3. The apparatus according to claim 1, wherein if the evaluation value is not less than a threshold, the second correction unit multiplies a dark component of the first dark image by a coefficient based on the evaluation value, thereby obtaining a variation amount of the dark component of the first dark image, and
performs the correction processing of removing the varying dark component included in the corrected image by subtracting the obtained variation amount of the dark component from the corrected image corrected by the first correction unit.

4. The apparatus according to claim 1, wherein the evaluation value obtaining unit multiplies each of a plurality of object images by a weight coefficient representing a tendency of the varying dark component, and generates an evaluation image by adding multiplication results.

5. The apparatus according to claim 4, wherein the evaluation value obtaining unit determines a magnitude order of output values of pixels of the evaluation image, and based on a determination result, obtains a partial region image formed from a predetermined ratio of pixels in ascending order of the output values.

6. The apparatus according to claim 4, wherein the evaluation value obtaining unit obtains a partial region image in which an output value of the evaluation image is smaller than a threshold.

7. The apparatus according to claim 6, wherein the evaluation value obtaining unit obtains, based on coordinate information of the partial region image, a portion corresponding to the partial region image in a difference image obtained by a difference between the second dark image and the first dark image, and obtains an average value of the output values of the pixels in the obtained region as the evaluation value.

8. The apparatus according to claim 1, wherein the first correction unit subtracts the first dark image obtained in the state without radiation irradiation from the object image obtained in a state with radiation irradiation, thereby removing, as the dark component included in the object image, a fixed output of a detection unit configured to detect radiation.

9. The apparatus according to claim 8, wherein the evaluation value obtaining unit generates a histogram of output values of the detection unit for a difference image obtained by a difference between the second dark image and the first dark image,
classifies a distribution of the histogram by clustering processing, and
obtains the evaluation value used to remove the varying dark component included in the corrected image based on a result of the classification.

10. The apparatus according to claim 9, wherein if the distribution of the histogram has one cluster as the result of the classification by the clustering processing, the evaluation value obtaining unit obtains a median of the cluster as the evaluation value.

11. The apparatus according to claim 9, wherein if the distribution of the histogram has a plurality of clusters as the result of the classification by the clustering processing, the evaluation value obtaining unit obtains the median of a cluster of smaller output values out of the plurality of clusters as the evaluation value.

12. The apparatus according to claim 9, wherein the evaluation value obtaining unit classifies the distribution of the histogram into a first distribution corresponding to the varying dark component based on a variation in an operating temperature of the detection unit and a second distribution corresponding to the varying dark component based on an influence of an image lag generated at the time of object image capturing, and
obtains, based on the first distribution, the evaluation value used to remove the varying dark component included in the corrected image.

13. A radiation imaging apparatus comprising:
a radiation generator configured to generate radiation;
a detection unit configured to detect the radiation; and
an image processing apparatus configured to process image data detected by the detection unit,
the image processing apparatus comprising:
a first correction unit configured to perform correction processing of subtracting a first dark image obtained in a state without radiation irradiation from an object image, thereby removing a dark component of the object image;
an evaluation value obtaining unit configured to obtain an evaluation value by a varying dark component included in a corrected image that has undergone the correction processing based on the first dark image and a second dark image obtained after the first dark image; and
a second correction unit configured to perform correction processing of removing the varying dark component from the corrected image based on the evaluation value.

14. The apparatus according to claim 13, further comprising a data collection unit configured to collect the image data detected by the detection unit and transmit the image data to the image processing apparatus,
wherein the data collection unit thins pixels of the image data in accordance with a predetermined transmission rate and transmits the image data to the image processing apparatus.

15. The apparatus according to claim 14, wherein the transmission rate is decided based on a ratio of all pixel data of the detection unit and pixel data necessary for display of a display unit.

16. An image processing method comprising:
performing correction processing of subtracting a first dark image obtained in a state without radiation irradiation from an object image, thereby removing a dark component of the object image;

obtaining an evaluation value by a varying dark component included in a corrected image that has undergone the correction processing based on the first dark image and a second dark image obtained after the first dark image; and performing correction processing of removing the varying dark component from the corrected image based on the evaluation value.

17. A non-transitory computer-readable storage medium storing a program that causes a computer to function as each unit of an image processing apparatus, the image processing apparatus comprising:

a first correction unit configured to perform correction processing of subtracting a first dark image obtained in a state without radiation irradiation from an object image, thereby removing a dark component of the object image;

an evaluation value obtaining unit configured to obtain an evaluation value by a varying dark component included in a corrected image that has undergone the correction processing based on the first dark image and a second dark image obtained after the first dark image; and a second correction unit configured to perform correction processing of removing the varying dark component from the corrected image based on the evaluation value.

* * * * *